US011129199B2

(12) United States Patent
Zhang et al.

(10) Patent No.: US 11,129,199 B2
(45) Date of Patent: Sep. 21, 2021

(54) DATA TRANSMISSION METHOD, NETWORK DEVICE, AND USER EQUIPMENT

(71) Applicant: HUAWEI TECHNOLOGIES CO., LTD., Guangdong (CN)

(72) Inventors: Chi Zhang, Shanghai (CN); Junchao Li, Shanghai (CN); Zhengwei Gong, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 25 days.

(21) Appl. No.: 16/186,835

(22) Filed: Nov. 12, 2018

(65) Prior Publication Data

US 2019/0082472 A1  Mar. 14, 2019

Related U.S. Application Data

(63) Continuation of application No. PCT/CN2017/084173, filed on May 12, 2017.

(30) Foreign Application Priority Data

May 12, 2016  (CN) .......................... 201610317243.7

(51) Int. Cl.
*H04W 74/08*  (2009.01)
*H04W 72/04*  (2009.01)
*H04W 74/00*  (2009.01)

(52) U.S. Cl.
CPC ... *H04W 74/0833* (2013.01); *H04W 72/0446* (2013.01); *H04W 74/006* (2013.01)

(58) Field of Classification Search
CPC ......... H04W 4/70; H04W 74/00–0891; H04W 72/0446
See application file for complete search history.

(56) References Cited

U.S. PATENT DOCUMENTS

2010/0296467 A1  11/2010  Pelletier et al.
2013/0343307 A1*  12/2013  Desai .................... H04W 74/04
370/329

(Continued)

FOREIGN PATENT DOCUMENTS

CN  103716895 A  4/2014
CN  103945557 A  7/2014

(Continued)

OTHER PUBLICATIONS

3GPP TS 36.211 V13.1.0 (Mar. 2016), 3rd Generation Partnership Project;Technical Specification Group Radio Access Network;Evolved Universal Terrestrial Radio Access (E-UTRA);Physical channels and modulation(Release 13), Mar. 2016. total 155 pages.

(Continued)

*Primary Examiner* — Michael Thier
*Assistant Examiner* — Prince A Mensah
(74) *Attorney, Agent, or Firm* — Fish & Richardson P.C.

(57) ABSTRACT

Embodiments of the present invention provide a data transmission method, a network device, and user equipment, including: sending, by the network device, first indication information and second indication information to the user equipment, where the first indication information is used to indicate a frequency domain resource of a physical random access channel of the user equipment, the second indication information is physical layer control signaling, the second indication information is used to indicate a time domain resource of the physical random access channel, and a random access resource corresponding to the frequency domain resource and the time domain resource is used to carry random access information of the user equipment. In the embodiments of the present invention, a resource of a random access channel is dynamically indicated by using the (Continued)

physical layer control signaling, to improve random access resource allocation flexibility.

9 Claims, 8 Drawing Sheets

(56) References Cited

U.S. PATENT DOCUMENTS

| | | | |
|---|---|---|---|
| 2015/0326995 A1* | 11/2015 | Li | H04W 74/08 |
| | | | 370/329 |
| 2015/0359007 A1 | 12/2015 | Liu et al. | |
| 2016/0105908 A1* | 4/2016 | Li | H04W 4/70 |
| | | | 370/329 |
| 2016/0183295 A1 | 6/2016 | Liu et al. | |
| 2017/0048906 A1* | 2/2017 | Lee | H04W 76/14 |
| 2019/0029050 A1* | 1/2019 | Li | H04L 5/1469 |

FOREIGN PATENT DOCUMENTS

| | | |
|---|---|---|
| CN | 103973412 A | 8/2014 |
| CN | 104349476 A | 2/2015 |
| EP | 3402266 A1 | 11/2018 |
| JP | 2015146633 A | 8/2015 |

OTHER PUBLICATIONS

International Search Report and Written Opinion issued in International Application No. PCT/CN2017/084173 dated Aug. 2, 2017, 19 pages.

LG Electronics:"Random access procedure in LAA", 3GPP Draft;R1-162471, Apr. 2, 2016, XP051080209, 6 pages.

3rd Generation Partnership Project; Technical Specification Group Radio Access Network;Evolved Universal Terrestrial Radio Acces(E-UTRA);Medium Access Control (MAC) protocol specification(Release 13), 3GPP Standard;3GPP TS 36.321, vol. RAN WG2, No. V13.1.0, Apr. 1, 2016, pp. 1-85, XP051088535.

3rd Generation Partnership Project;Technical Specification Group Radio Access Network;Evolved Universal Terrestrial Radio Acces(E-UTRA);Radio Resource Control (RRC);Protocol specification(Release 13), 3GPP Standard;3GPP TS 36.331, vol. RAN WG2, No. V13.1.0, Apr. 1, 2016, pp. 1-551, XP051088537.

Intel Corporation:"PRACH Transmission for eLAA", 3GPP Draft;R1-164131, May 14, 2016, XP051090085, 6 pages.

Extended European Search Report issued in European Application No. 17795621.6 dated Mar. 15, 2019, 12 pages.

R1-16xxxx—MCC Support [online], "Draft Report of 3GPP TSG RAN WG1 #84bis v0.1.0 (Busan, Korea, Apr. 11-15, 2016)" 3GPP TSG-RAN WG1 Meeting #85, Nanjing, China, retrieved from URL: <http://www.3gpp.org/ftp/tsg_ran/WG1_RL1/TSGR1_84b/Report/Draft_Minutes_report_RAN1#84bis_v010.zip>, May 23-27, 2016, 4 pages.

R1-162471—LG Electronics, "Random access procedure in LAA," 3GPP TSG RAN WG1 meeting #84bis, Busan, Korea, Apr. 11-15, 2016, 5 pages.

R1-163961—MCC Support, "Final Report of 3GPP TSG RAN WG1 #84bis v1.0.0. (Busan, Korea, Apr. 11-15, 2016)," 3GPP TSG RAN WG1 Meeting #85, Nanjing, China, May 23-27, 2016, 158 pages.

Office Action issued in Japanese Application No. 2018-559256 dated Nov. 5, 2019, 9 pages (with English translation).

* cited by examiner

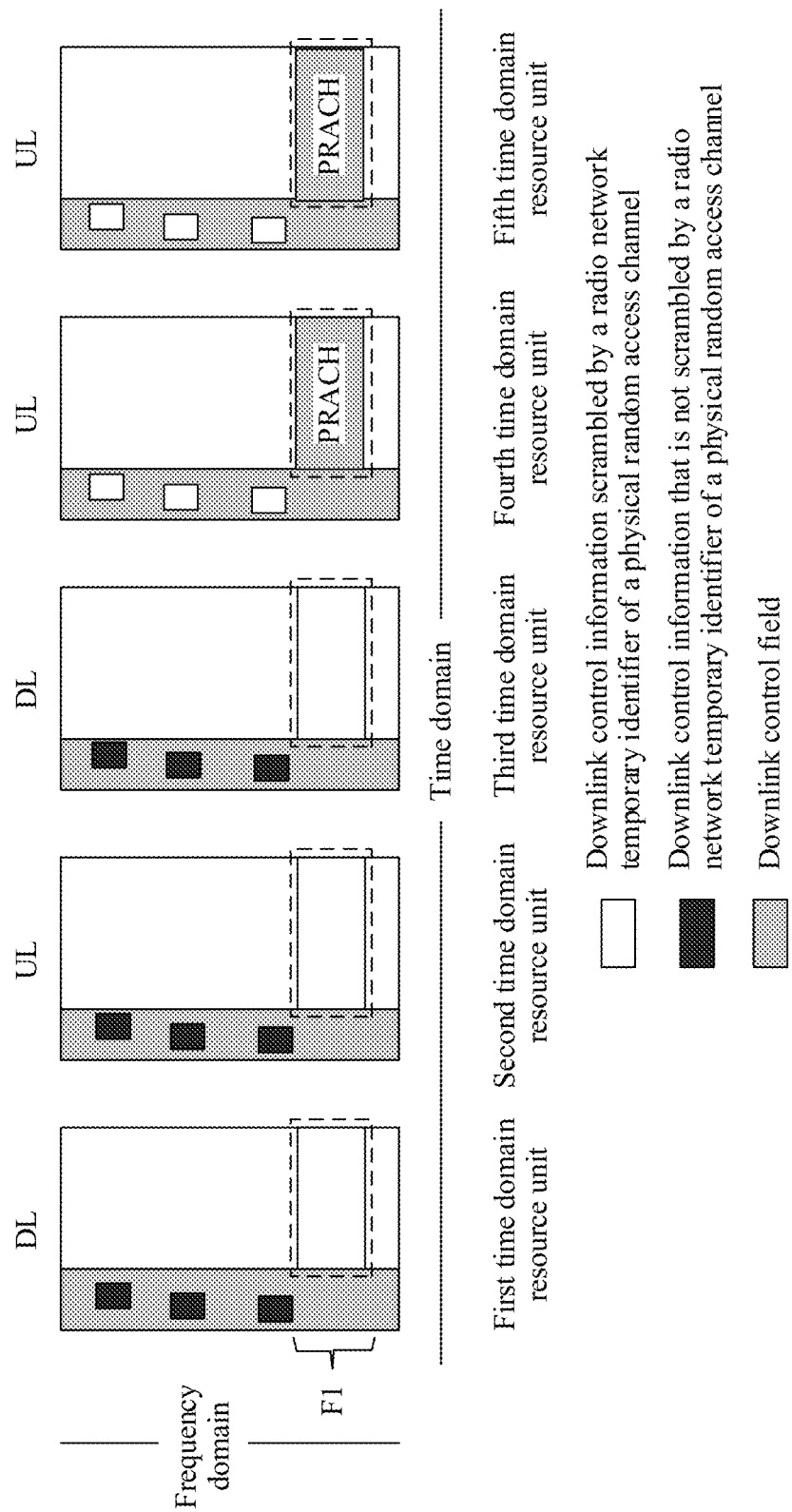
FIG. 3.1

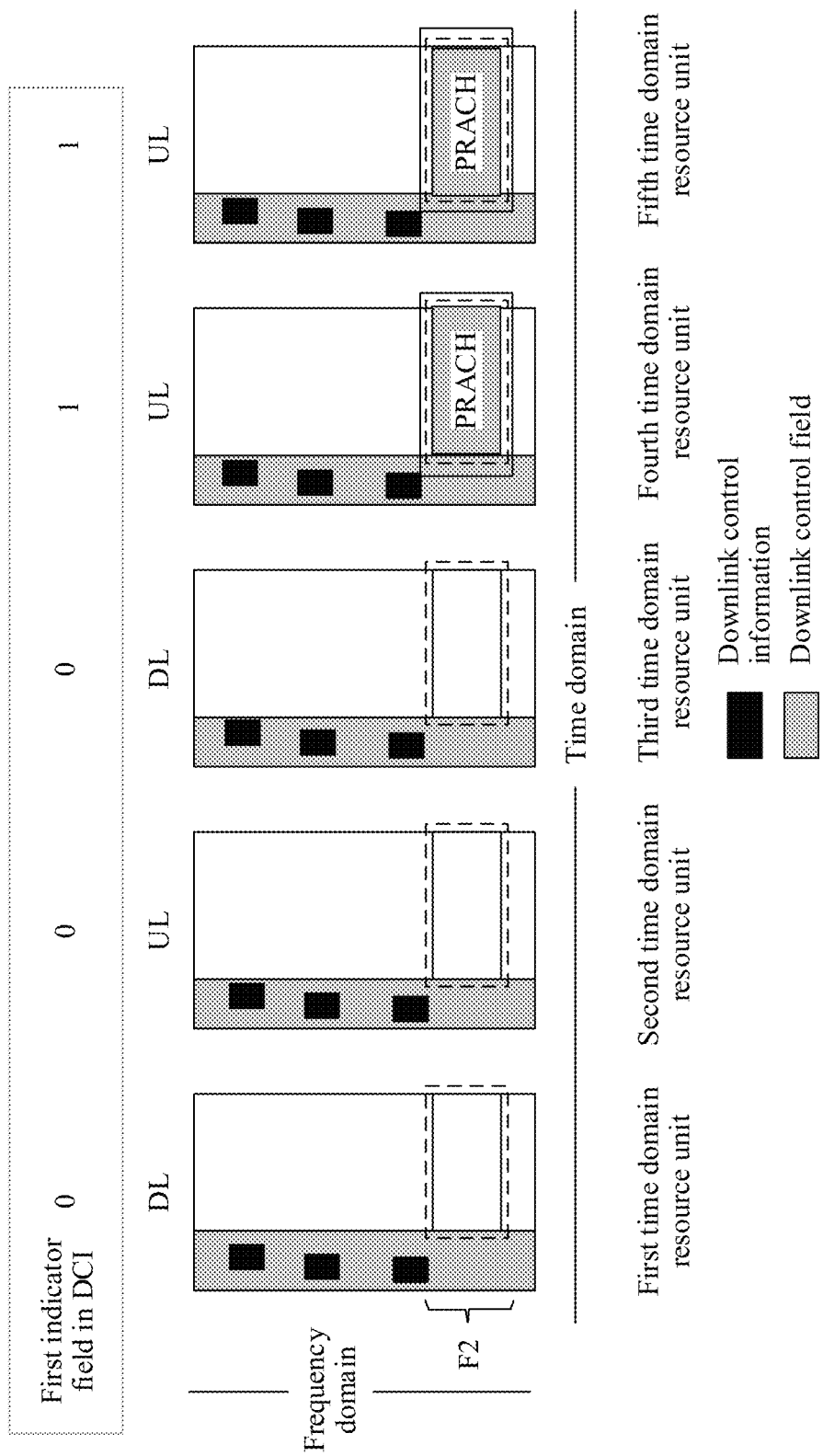
FIG. 3.2

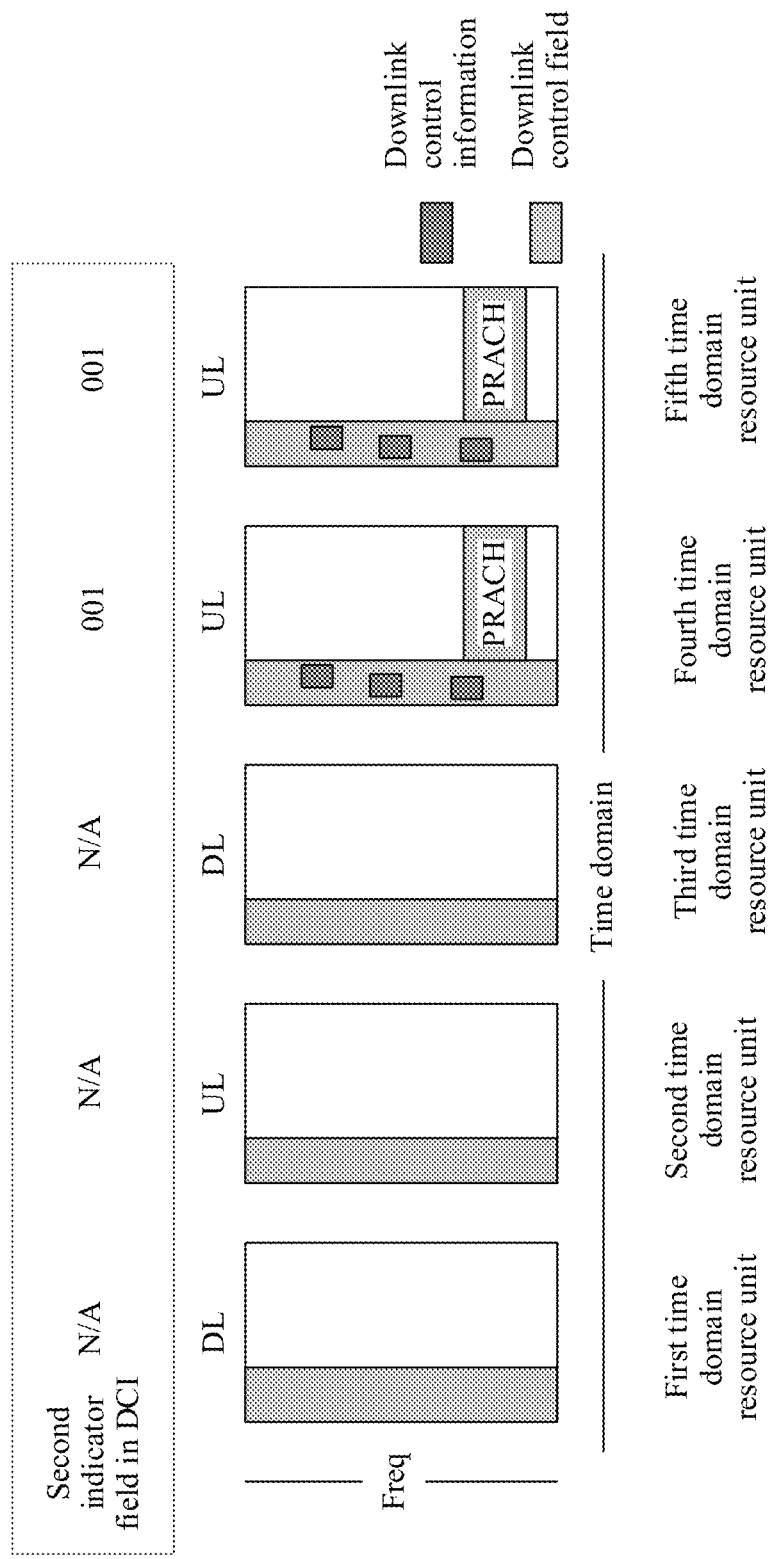
FIG. 4.1

DATA TRANSMISSION METHOD, NETWORK DEVICE, AND USER EQUIPMENT

CROSS-REFERENCE TO RELATED APPLICATIONS

This application is a continuation of International Application No. PCT/CN2017/084173, filed on May 12, 2017, which claims priority to Chinese Patent Application No. 201610317243.7, filed on May 12, 2016, The disclosures of the aforementioned applications are hereby incorporated by reference in their entireties.

TECHNICAL FIELD

The present invention relates to the field of wireless communications technologies, and in particular, to a data transmission method, a network device, and user equipment.

BACKGROUND

In a random access procedure that is of user equipment (UE) and that is specified in an existing Long Term Evolution (LTE) communications system, a network device needs to send, to the UE, a system information block SIB 2 broadcast message that includes a predefined random access resource index number, and the UE queries a prestored random access resource configuration table based on the index number, to determine a corresponding random access resource on which a random access procedure may be initiated. The random access resource has a corresponding clear definition in all predefined different uplink-downlink subframe configurations. The index number is semi-statically provided by the network device by using higher layer signaling (the SIB 2 broadcast message). To be specific, the UE queries the table based on an index number that is sent by the network device and that is associated with the uplink-downlink subframe configuration, to determine a random access resource on which the random access procedure may be initiated.

The inventor of this technical solution finds, in a research process, that the foregoing semi-static random access resource allocation solution is a resource allocation solution that is limited by the predefined uplink-downlink subframe configuration, and this limits radio resource allocation flexibility of a communications system, and cannot be applied to a communications system in which uplink and downlink resources of a cell are dynamically determined by a network device.

SUMMARY

Embodiments of the present invention provide a data transmission method, a network device, and user equipment, to dynamically indicate a resource of a random access channel by using physical layer control signaling, and improve random access resource allocation flexibility.

According to a first aspect, an embodiment of the present invention provides a data transmission method, including:

sending, by a network device, first indication information and second indication information to user equipment, where the first indication information is used to indicate a frequency domain resource of a physical random access channel of the user equipment, the second indication information is physical layer control signaling, the second indication information is used to indicate a time domain resource of the physical random access channel, and a random access resource determined by the frequency domain resource and the time domain resource is used to carry random access information of the user equipment.

Further, the network device receives the random access information that is of the user equipment and that is carried on the random access resource.

The second indication information may be specifically common physical layer downlink control signaling, or may be a group physical layer downlink control signaling. When the second indication information is common physical layer downlink control signaling, the network device sends the second indication information to all user equipments in a cell; or when the second indication information is group physical layer downlink control signaling, the network device sends the second indication information to some user equipments in a cell.

It can be learned that in this embodiment of the present invention, the first indication information indicates the frequency domain resource of the physical random access channel of the user equipment, the second indication information indicates the time domain resource of the physical random access channel, and the second indication information is physical layer control signaling. In comparison with a method for semi-statically indicating a random access resource by periodically sending a SIB broadcast message in the prior art, the physical layer control signaling is notified in real time, and therefore, the time domain resource of the random access channel can be dynamically indicated by using the physical layer control signaling. Therefore, this embodiment of the present invention can meet a requirement for dynamic indication of a random access resource in a communications system, and improve random access resource allocation flexibility.

With reference to the first aspect, in some possible implementations, the second indication information is carried on a time domain resource unit n; and the time domain resource is a time domain resource unit n+k that is separated from the time domain resource unit n by k time domain resource units, the time domain resource unit is a preset transmission time interval in time domain, or the time domain resource unit is a preset transmission time period in time domain, n is an integer greater than or equal to 0, and k is an integer greater than or equal to 0.

The transmission time interval is a length of independent decoding transmission on a radio link, and is a time domain resource unit concept of a logical layer, for example, a transmission time interval TTI parameter in an LTE system. The transmission time period is a time domain resource allocation duration parameter of a physical layer, and is a time domain resource unit concept of the physical layer, for example, a subframe parameter in the LTE system.

With reference to the first aspect, in some possible implementations, the second indication information is scrambled based on a preset identifier, and the preset identifier is used by the user equipment to: descramble the second indication information, and determine that the time domain resource unit n+k is used as the time domain resource of the physical random access channel.

The preset identifier may be a preset specific radio network temporary identifier RNTI that is used to scramble and descramble the second indication information. The preset identifier is used to identify that the time domain resource unit n+k is used as the time domain resource of the physical random access channel. For example, the preset identifier may be a radio network temporary identifier of the physical random access channel.

With reference to the first aspect, in some possible implementations, the second indication information includes a first indicator field, and the first indicator field is used to indicate that the time domain resource unit n+k is used as the time domain resource of the physical random access channel.

The first indicator field may be, for example, a bit that carries identification information 0 or 1 in the second indication information. The network device may set the identification information 0 or 1, to notify the user equipment that the time domain resource unit n+k is used as the time domain resource of the physical random access channel.

With reference to the first aspect, in some possible implementations, the first indicator field is further used to indicate a value of k.

The first indicator field may be, for example, three bits that carry the identification information 0 or 1 in the second indication information, and the three bits are used to indicate a specific value of k. For example, 000 corresponds to k=0, 001 corresponds to k=1, 010 corresponds to k=2, 011 corresponds to k=3, 100 corresponds to k=4, 101 corresponds to k=5, 110 corresponds to k=6, and 111 corresponds to k=7.

With reference to the first aspect, in some possible implementations, the first indication information includes system information or radio resource control signaling.

According to a second aspect, an embodiment of the present invention provides a data transmission method, including:

sending, by a network device, third indication information to user equipment, where the third indication information is physical layer control signaling, the third indication information is used to indicate a frequency domain resource and a time domain resource that are of a physical random access channel of the user equipment, and a random access resource determined by the frequency domain resource and the time domain resource is used to carry random access information of the user equipment.

Further, the network device receives the random access information that is of the user equipment and that is carried on the random access resource.

The third indication information may be specifically common physical layer downlink control signaling, or may be a group physical layer downlink control signaling. When the third indication information is common physical layer downlink control signaling, the network device sends the third indication information to all user equipments in a cell; or when the third indication information is group physical layer downlink control signaling, the network device sends the third indication information to some user equipments in a cell.

It can be learned that in this embodiment of the present invention, the third indication information indicates the frequency domain resource and the time domain resource of the physical random access channel of the user equipment, and the third indication information is physical layer control signaling. In comparison with a method for semi-statically indicating a random access resource by periodically sending a SIB broadcast message in the prior art, the physical layer control signaling is notified in real time, and therefore, a time-frequency resource of the physical random access channel can be dynamically indicated by using the physical layer control signaling. Therefore, this embodiment of the present invention can meet a requirement for dynamic indication of a random access resource in a communications system, and improve random access resource allocation flexibility.

With reference to the second aspect, in some possible implementations, the third indication information includes a second indicator field, and the second indicator field is used to indicate the frequency domain resource.

The second indicator field may be, for example, a plurality of bits that carry identification information 0 or 1 in the third indication information. The bits are used to indicate a specific frequency domain resource that is on a time domain resource unit and that may be used as the frequency domain resource of the physical random access channel of the user equipment. For example, an identification information sequence 001 corresponding to the bits is used to indicate that a frequency domain resource whose index is 1 is used as the frequency domain resource of the physical random access channel.

With reference to the second aspect, in some possible implementations, the third indication information is carried on a time domain resource unit n; and the time domain resource is a time domain resource unit n+k that is separated from the time domain resource unit n by k time domain resource units, the time domain resource unit is a preset transmission time interval in time domain, or the time domain resource unit is a preset transmission time period in time domain, n is an integer greater than or equal to 0, and k is an integer greater than or equal to 0.

The transmission time interval is a length of independent decoding transmission on a radio link, and is a time domain resource unit concept of a logical layer, for example, a transmission time interval TTI parameter in an LTE system. The transmission time period is a time domain resource allocation duration parameter of a physical layer, and is a time domain resource unit concept of the physical layer, for example, a subframe parameter in the LTE system.

With reference to the second aspect, in some possible implementations, a format of the third indication information is a preset format, and the preset format is used to indicate that the time domain resource unit n+k is used as the time domain resource of the physical random access channel.

With reference to the second aspect, in some possible implementations, the third indication information is scrambled based on a preset identifier, and the preset identifier is used by the user equipment to: descramble the third indication information, and determine that the time domain resource unit n+k is used as the time domain resource of the physical random access channel.

The preset identifier may be a preset specific radio network temporary identifier RNTI that is used to scramble and descramble the third indication information, for example, may be a radio network temporary identifier of the physical random access channel.

With reference to the second aspect, in some possible implementations, the third indication information includes a third indicator field, and the third indicator field is used to indicate that the time domain resource unit n+k is used as the time domain resource of the physical random access channel.

The third indicator field may be, for example, a bit that carries identification information 0 or 1 in the third indication information. The network device may set the identification information 0 or 1, to notify the user equipment that the time domain resource unit n+k is used as the time domain resource of the physical random access channel.

With reference to the second aspect, in some possible implementations, the third indicator field may be further used to indicate a value of k.

The third indicator field may be, for example, three bits that carry the identification information 0 or 1 in the third indication information, and the three bits are used to indicate a specific value of k. For example, 000 corresponds to k=0, 001 corresponds to k=1, 010 corresponds to k=2, 011 corresponds to k=3, 100 corresponds to k=4, 101 corresponds to k=5, 110 corresponds to k=6, and 111 corresponds to k=7.

According to a third aspect, an embodiment of the present invention provides a data transmission method, including:

receiving, by user equipment, first indication information and second indication information from a network device, where the first indication information is used to indicate a frequency domain resource of a physical random access channel of the user equipment, the second indication information is a physical layer control signalling, the second indication information is used to indicate a time domain resource of the physical random access channel, and a random access resource determined by the frequency domain resource and the time domain resource is used to carry random access information of the user equipment.

Further, the user equipment determines the frequency domain resource of the physical random access channel based on the first indication information, determines the time domain resource of the physical random access channel based on the second indication information, adds the random access information to the random access resource determined by the frequency domain resource and the time domain resource, and sends the random access information to the network device.

The second indication information may be specifically common physical layer downlink control signaling, or may be a group physical layer downlink control signalling. When the second indication information is common physical layer downlink control signaling, the network device sends the second indication information to all user equipments in a cell; or when the second indication information is group physical layer downlink control signalling, the network device sends the second indication information to some user equipments in a cell.

It can be learned that in this embodiment of the present invention, the first indication information indicates the frequency domain resource of the physical random access channel of the user equipment, the second indication information indicates the time domain resource of the physical random access channel, and the second indication information is physical layer control signaling. In comparison with a method for semi-statically indicating a random access resource by periodically sending a SIB broadcast message in the prior art, the physical layer control signaling is notified in real time, and therefore, the time domain resource of the physical random access channel can be dynamically indicated by using the physical layer control signaling. Therefore, this embodiment of the present invention can meet a requirement for dynamic indication of a random access resource in a communications system, and improve random access resource allocation flexibility.

With reference to the third aspect, in some possible implementations, the second indication information is carried on a time domain resource unit n; and the time domain resource is a time domain resource unit n+k that is separated from the time domain resource unit n by k time domain resource units, the time domain resource unit is a preset transmission time interval in time domain, or the time domain resource unit is a preset transmission time period in time domain, n is an integer greater than or equal to 0, and k is an integer greater than or equal to 0.

The transmission time interval is a length of independent decoding transmission on a radio link, and is a time domain resource unit concept of a logical layer, for example, a transmission time interval TTI parameter in an LTE system. The transmission time period is a time domain resource allocation duration parameter of a physical layer, and is a time domain resource unit concept of the physical layer, for example, a subframe parameter in the LTE system.

With reference to the third aspect, in some possible implementations, the second indication information is scrambled based on a preset identifier, and the preset identifier is used by the user equipment to: descramble the second indication information, and determine that the time domain resource unit n+k is used as the time domain resource of the physical random access channel.

The preset identifier is used to identify that the time domain resource unit n+k is used as the time domain resource of the physical random access channel. The preset identifier may be a preset specific radio network temporary identifier RNTI that is used to scramble and descramble the second indication information, for example, may be a radio network temporary identifier of the physical random access channel.

With reference to the third aspect, in some possible implementations, the second indication information includes a first indicator field, and the first indicator field is used to indicate that the time domain resource unit n+k is used as the time domain resource of the physical random access channel.

The first indicator field may be, for example, a bit that carries identification information 0 or 1 in the second indication information. The network device may set the identification information 0 or 1, to notify the user equipment that the time domain resource unit n+k is used as the time domain resource of the physical random access channel.

With reference to the third aspect, in some possible implementations, the first indicator field is further used to indicate a value of k.

The first indicator field may be, for example, three bits that carry the identification information 0 or 1 in the second indication information, and the three bits are used to indicate a specific value of k. For example, 000 corresponds to k=0, 001 corresponds to k=1, 010 corresponds to k=2, 011 corresponds to k=3, 100 corresponds to k=4, 101 corresponds to k=5, 110 corresponds to k=6, and 111 corresponds to k=7.

With reference to the third aspect, in some possible implementations, the first indication information includes system information or radio resource control signaling.

According to a fourth aspect, an embodiment of the present invention provides a data transmission method, including:

receiving, by user equipment, third indication information from a network device, where the third indication information is physical layer control signaling, the third indication information is used to indicate a frequency domain resource and a time domain resource that are of a physical random access channel of the user equipment, and a random access resource determined by the frequency domain resource and the time domain resource is used to carry random access information of the user equipment.

Further, the user equipment determines the time domain resource and the frequency domain resource of the physical random access channel based on the third indication information, adds the random access information to the random access resource determined by the frequency domain resource and the time domain resource, and sends the random access information to the network device.

The third indication information may be specifically common physical layer downlink control signaling, or may be a group physical layer downlink control signaling. When the third indication information is common physical layer downlink control signaling, the network device sends the third indication information to all user equipments in a cell; or when the third indication information is group physical layer downlink control signaling, the network device sends the third indication information to some user equipments in a cell.

It can be learned that in this embodiment of the present invention, the third indication information indicates the frequency domain resource and the time domain resource of the physical random access channel of the user equipment, and the third indication information is physical layer control signaling. In comparison with a method for semi-statically indicating a random access resource by periodically sending a SIB broadcast message in the prior art, the physical layer control signaling is notified in real time, and therefore, a time-frequency resource of the physical random access channel can be dynamically indicated by using the physical layer control signaling. Therefore, this embodiment of the present invention can meet a requirement for dynamic indication of a random access resource in a communications system, and improve random access resource allocation flexibility.

With reference to the fourth aspect, in some possible implementations, the third indication information includes a second indicator field, and the second indicator field is used to indicate the frequency domain resource.

The second indicator field may be, for example, a plurality of bits that carry identification information 0 or 1 in the third indication information. The bits are used to indicate a specific frequency domain resource that is on a time domain resource unit and that may be used as the frequency domain resource of the physical random access channel of the user equipment. For example, an identification information sequence 001 corresponding to the bits is used to indicate that a frequency domain resource whose index is 1 is used as the frequency domain resource of the physical random access channel.

With reference to the fourth aspect, in some possible implementations, the third indication information is carried on a time domain resource unit n; and the time domain resource is a time domain resource unit n+k that is separated from the time domain resource unit n by k time domain resource units, the time domain resource unit is a preset transmission time interval in time domain, or the time domain resource unit is a preset transmission time period in time domain, n is an integer greater than or equal to 0, and k is an integer greater than or equal to 0.

The transmission time interval is a length of independent decoding transmission on a radio link, and is a time domain resource unit concept of a logical layer, for example, a transmission time interval TTI parameter in an LTE system. The transmission time period is a time domain resource allocation duration parameter of a physical layer, and is a time domain resource unit concept of the physical layer, for example, a subframe parameter in the LTE system.

With reference to the fourth aspect, in some possible implementations, a format of the third indication information is a preset format, and the preset format is used to indicate that the time domain resource unit n+k is used as the time domain resource of the physical random access channel.

The time domain resource is determined by the user equipment when the user equipment detects that the format of the third indication information is the preset format.

With reference to the fourth aspect, in some possible implementations, the third indication information is scrambled based on a preset identifier, and the preset identifier is used by the user equipment to: descramble the third indication information, and determine that the time domain resource unit n+k is used as the time domain resource of the physical random access channel.

The preset identifier may be a preset specific radio network temporary identifier RNTI that is used to scramble and descramble the third indication information, for example, may be a radio network temporary identifier of the physical random access channel.

With reference to the fourth aspect, in some possible implementations, the third indication information includes a third indicator field, and the third indicator field is used to indicate that the time domain resource unit n+k is used as the time domain resource of the physical random access channel.

The third indicator field may be, for example, a bit that carries identification information 0 or 1 in the third indication information. The network device may set the identification information 0 or 1, to notify the user equipment that the time domain resource unit n+k is used as the time domain resource of the physical random access channel.

With reference to the fourth aspect, in some possible implementations, the third indicator field is further used to indicate a value of k.

The third indicator field may be, for example, three bits that carry the identification information 0 or 1 in the third indication information, and the three bits are used to indicate a specific value of k. For example, 000 corresponds to k=0, 001 corresponds to k=1, 010 corresponds to k=2, 011 corresponds to k=3, 100 corresponds to k=4, 101 corresponds to k=5, 110 corresponds to k=6, and 111 corresponds to k=7.

According to a fifth aspect, an embodiment of the present invention provides a network device. The network device includes a function module, and the function module is configured to perform some or all steps described in any method according to the first aspect or the second aspect of the embodiments of the present invention.

According to a sixth aspect, an embodiment of the present invention provides user equipment. The user equipment includes a function module, and the function module is configured to perform some or all steps described in any method according to the third aspect or the fourth aspect of the embodiments of the present invention.

According to a seventh aspect, an embodiment of the present invention provides a network device, including:

a processor, an interface circuit, a memory, and a bus, where the processor, the interface circuit, and the memory are connected and complete mutual communication by using the bus;

the interface circuit is configured to communicate with user equipment under control of the processor, and the memory stores executable program code; and the processor is configured to invoke the executable program code, to perform some or all steps described in any method according to the first aspect or the second aspect of the embodiments of the present invention.

According to an eighth aspect, an embodiment of the present invention provides user equipment, including:

a processor, a memory, a communications interface, and a bus, where the processor, the memory, and the communications interface are connected and complete mutual communication by using the bus;

the communications interface is configured to communicate with a network device, and the memory stores executable program code; and the processor is configured to invoke the executable program code, to perform some or all steps described in any method according to the third aspect or the fourth aspect of the embodiments of the present invention.

According to a ninth aspect, an embodiment of the present invention provides a computer readable storage medium, and the computer readable storage medium stores program code. The program code includes an instruction used to perform some or all steps described in any method according to the first aspect or the second aspect of the embodiments of the present invention.

According to a tenth aspect, an embodiment of the present invention provides a computer readable storage medium, and the computer readable storage medium stores program code. The program code includes an instruction used to perform some or all steps described in any method according to the third aspect or the fourth aspect of the embodiments of the present invention.

BRIEF DESCRIPTION OF DRAWINGS

To describe the embodiments of the present invention more clearly, the following briefly describes the accompanying drawings required for describing the embodiments or the prior art.

FIG. 3.1 is a schematic diagram of a time-frequency resource of a physical random access channel according to an embodiment of the present invention;

FIG. 3.2 is a schematic diagram of a time-frequency resource of another physical random access channel according to an embodiment of the present invention;

FIG. 4.1 is a schematic diagram of a time-frequency resource of still another physical random access channel according to an embodiment of the present invention;

DESCRIPTION OF EMBODIMENTS

The following describes the technical solutions in the embodiments of the present invention with reference to the accompanying drawings in the embodiments of the present invention.

Figure 1:
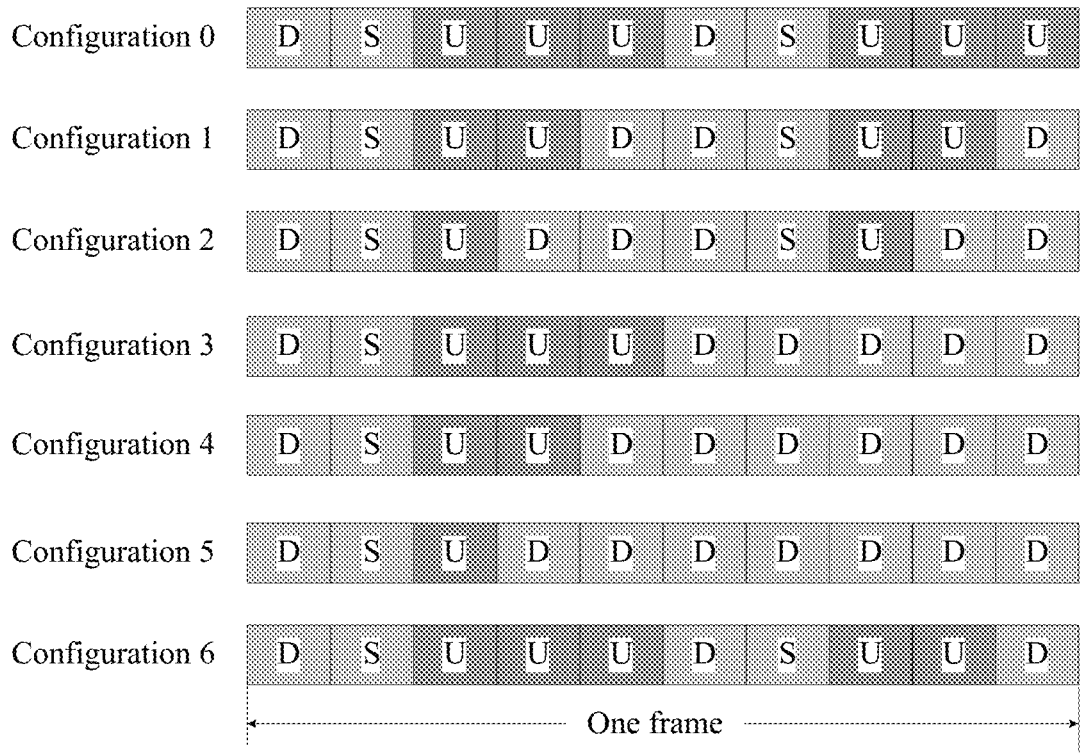
FIG. 1 is a schematic diagram of seven time division duplex TDD uplink-downlink subframe configurations used for eIMTA in 3GPP in the prior art.

For ease of understanding of the technical solutions in the embodiments of the present invention, a random access resource allocation solution in an existing Long Term Evolution (Long Term Evolution, LTE) communications system is first described herein. As shown in FIG. 1, FIG. 1 is a schematic diagram of seven time division duplex (Time Division Duplex, TDD) uplink-downlink subframe configurations specified in the enhanced Interference Management and Traffic Adaptation (enhanced Interference Management and Traffic Adaptation, eIMTA) protocol of the current 3rd Generation Partnership Project (3rd Generation Partnership Project, 3GPP). In a random access procedure of the LTE communications system, a base station notifies, by using a higher layer signaling (a SIB 2 broadcast message), user equipment (User Equipment, UE) in a cell of an available physical random access channel PRACH time-frequency resource set of the cell. As shown in Table 1, Table 1 is a time-frequency resource list that may be used for random access and that is defined for a TDD frame structure in the current 3GPP 36.211. Each row in the table represents one random access resource configuration, the random access resource configuration is specifically indicated by an index number PRACH configuration index, and each random access resource configuration in different uplink-downlink subframe configurations (UL/DL configuration) has a clear definition. Each quaternary element group ($f_{RA}$, $t_{RA}^{(0)}$, $t_{RA}^{(1)}$, $t_{RA}^{(2)}$) in the table uniquely designates one specific random access resource. A first element $f_{RA}$ in the element group is used to indicate a frequency domain resource in the random access resource. For example, a first element 0 of an element group (0, 1, 0, 2) is used to indicate that a frequency domain resource in a random access resource is a frequency domain resource whose index is 0. A second element $t_{RA}^{(0)}$ is used to indicate a system frame that is used to send a preamble. When $t_{RA}^{(0)}=0$, it indicates that all system frames may send the preamble; when $t_{RA}^{(0)}=1$, it indicates that an even system frame may send the preamble; and when $t_{RA}^{(0)}=2$, it indicates that an odd system frame may send the preamble. A third element $t_{RA}^{(1)}$ is used to indicate whether the preamble is located in a first half-frame or a second half-frame of a system frame. When $t_{RA}^{(1)}=0$, it indicates that the preamble is located in a first half-frame of a system frame; and when $t_{RA}^{(1)}=1$, it indicates that the preamble is located in a second half-frame of a system frame. A fourth element $t_{RA}^{(2)}$ is used to designate an initial uplink subframe index of the preamble, and the subframe index is located between two consecutive downlink-to-uplink switch points, and counting starts from 0. A preamble format Preamble Format 4 is an exception, and $t_{RA}^{(2)}$ of the Preamble Format 4 is marked as (*). The index number PRACH configuration index is semi-statically provided by the higher layer signaling (the SIB 2 broadcast message).

TABLE 1

LTE TDD random access time-frequency resource configuration

| PRACH configuration index (See Table 5.7.1-3) | UL/DL configuration (see Table 4.2-2) | | | | | | |
|---|---|---|---|---|---|---|---|
| | 0 | 1 | 2 | 3 | 4 | 5 | 6 |
| 0 | (0, 1, 0, 2) | (0, 1, 0, 1) | (0, 1, 0, 0) | (0, 1, 0, 2) | (0, 1, 0, 1) | (0, 1, 0, 0) | (0, 1, 0, 2) |
| 1 | (0, 2, 0, 2) | (0, 2, 0, 1) | (0, 2, 0, 0) | (0, 2, 0, 2) | (0, 2, 0, 1) | (0, 2, 0, 0) | (0, 2, 0, 2) |
| 2 | (0, 1, 1, 2) | (0, 1, 1, 1) | (0, 1, 1, 0) | (0, 1, 0, 1) | (0, 1, 0, 0) | N/A | (0, 1, 1, 1) |
| 3 | (0, 0, 0, 2) | (0, 0, 0, 1) | (0, 0, 0, 0) | (0, 0, 0, 2) | (0, 0, 0, 1) | (0, 0, 0, 0) | (0, 0, 0, 2) |
| 4 | (0, 0, 1, 2) | (0, 0, 1, 1) | (0, 0, 1, 0) | (0, 0, 0, 1) | (0, 0, 0, 0) | N/A | (0, 0, 1, 1) |
| 5 | (0, 0, 0, 1) | (0, 0, 0, 0) | N/A | (0, 0, 0, 0) | N/A | N/A | (0, 0, 0, 1) |
| 6 | (0, 0, 0, 2) (0, 0, 1, 2) | (0, 0, 0, 1) (0, 0, 1, 1) | (0, 0, 0, 0) (0, 0, 1, 0) | (0, 0, 0, 1) (0, 0, 0, 2) | (0, 0, 0, 0) (0, 0, 0, 1) | (0, 0, 0, 0) (1, 0, 0, 0) | (0, 0, 0, 2) (0, 0, 1, 1) |
| 7 | (0, 0, 0, 1) (0, 0, 1, 1) | (0, 0, 0, 0) (0, 0, 1, 0) | N/A | (0, 0, 0, 0) (0, 0, 0, 2) | N/A | N/A | (0, 0, 0, 1) (0, 0, 1, 0) |
| 8 | (0, 0, 0, 0) (0, 0, 1, 0) | N/A | N/A | (0, 0, 0, 0) (0, 0, 0, 1) | N/A | N/A | (0, 0, 0, 0) (0, 0, 1, 1) |
| 9 | (0, 0, 0, 1) (0, 0, 0, 2) (0, 0, 1, 2) | (0, 0, 0, 0) (0, 0, 0, 1) (0, 0, 1, 1) | (0, 0, 0, 0) (0, 0, 1, 0) (1, 0, 0, 0) | (0, 0, 0, 0) (0, 0, 0, 1) (0, 0, 0, 2) | (0, 0, 0, 0) (0, 0, 0, 1) (1, 0, 0, 1) | (0, 0, 0, 0) (1, 0, 0, 0) (2, 0, 0, 0) | (0, 0, 0, 1) (0, 0, 0, 2) (0, 0, 1, 1) |
| 10 | (0, 0, 0, 0) (0, 0, 1, 0) (0, 0, 1, 1) | (0, 0, 0, 1) (0, 0, 1, 0) (0, 0, 1, 1) | (0, 0, 0, 0) (0, 0, 1, 0) (1, 0, 1, 0) | N/A | (0, 0, 0, 0) (0, 0, 0, 1) (1, 0, 0, 0) | N/A | (0, 0, 0, 0) (0, 0, 0, 2) (0, 0, 1, 0) |
| ... | ... | ... | ... | ... | ... | ... | ... |
| 51 | (0, 0, 0, *) | (0, 0, 0, *) | (0, 0, 0, *) | (0, 0, 0, *) | (0, 0, 0, *) | (0, 0, 0, *) | (0, 0, 0, *) |
| 52 | (0, 0, 1, *) | (0, 0, 1, *) | (0, 0, 1, *) | N/A | N/A | N/A | (0, 0, 1, *) |
| 53 | (0, 0, 0, *) (0, 0, 1, *) | (0, 0, 0, *) (0, 0, 1, *) | (0, 0, 0, *) (0, 0, 1, *) | (0, 0, 0, *) (1, 0, 0, *) | (0, 0, 0, *) (1, 0, 0, *) | (0, 0, 0, *) (1, 0, 0, *) | (0, 0, 0, *) (0, 0, 1, *) |
| 54 | (0, 0, 0, *) (0, 0, 1, *) (1, 0, 0, *) | (0, 0, 0, *) (0, 0, 1, *) (1, 0, 0, *) | (0, 0, 0, *) (0, 0, 1, *) (1, 0, 0, *) | (0, 0, 0, *) (1, 0, 0, *) (2, 0, 0, *) | (0, 0, 0, *) (1, 0, 0, *) (2, 0, 0, *) | (0, 0, 0, *) (1, 0, 0, *) (2, 0, 0, *) | (0, 0, 0, *) (0, 0, 1, *) (1, 0, 0, *) |
| 55 | (0, 0, 0, *) (0, 0, 1, *) (1, 0, 0, *) (1, 0, 1, *) | (0, 0, 0, *) (0, 0, 1, *) (1, 0, 0, *) (1, 0, 1, *) | (0, 0, 0, *) (0, 0, 1, *) (1, 0, 0, *) (1, 0, 1, *) | (0, 0, 0, *) (1, 0, 0, *) (2, 0, 0, *) (3, 0, 0, *) | (0, 0, 0, *) (1, 0, 0, *) (2, 0, 0, *) (3, 0, 0, *) | (0, 0, 0, *) (1, 0, 0, *) (2, 0, 0, *) (3, 0, 0, *) | (0, 0, 0, *) (0, 0, 1, *) (1, 0, 0, *) (1, 0, 1, *) |
| 56 | (0, 0, 0, *) (0, 0, 1, *) (1, 0, 0, *) (1, 0, 1, *) (2, 0, 0, *) | (0, 0, 0, *) (0, 0, 1, *) (1, 0, 0, *) (1, 0, 1, *) (2, 0, 0, *) | (0, 0, 0, *) (0, 0, 1, *) (1, 0, 0, *) (1, 0, 1, *) (2, 0, 0, *) | (0, 0, 0, *) (1, 0, 0, *) (2, 0, 0, *) (3, 0, 0, *) (4, 0, 0, *) | (0, 0, 0, *) (1, 0, 0, *) (2, 0, 0, *) (3, 0, 0, *) (4, 0, 0, *) | (0, 0, 0, *) (1, 0, 0, *) (2, 0, 0, *) (3, 0, 0, *) (4, 0, 0, *) | (0, 0, 0, *) (0, 0, 1, *) (1, 0, 0, *) (1, 0, 1, *) (2, 0, 0, *) |
| 57 | (0, 0, 0, *) (0, 0, 1, *) (1, 0, 0, *) (1, 0, 1, *) (2, 0, 0, *) (2, 0, 1, *) | (0, 0, 0, *) (0, 0, 1, *) (1, 0, 0, *) (1, 0, 1, *) (2, 0, 0, *) (2, 0, 1, *) | (0, 0, 0, *) (0, 0, 1, *) (1, 0, 0, *) (1, 0, 1, *) (2, 0, 0, *) (2, 0, 1, *) | (0, 0, 0, *) (1, 0, 0, *) (2, 0, 0, *) (3, 0, 0, *) (4, 0, 0, *) (5, 0, 0, *) | (0, 0, 0, *) (1, 0, 0, *) (2, 0, 0, *) (3, 0, 0, *) (4, 0, 0, *) (5, 0, 0, *) | (0, 0, 0, *) (1, 0, 0, *) (2, 0, 0, *) (3, 0, 0, *) (4, 0, 0, *) (5, 0, 0, *) | (0, 0, 0, *) (0, 0, 1, *) (1, 0, 0, *) (1, 0, 1, *) (2, 0, 0, *) (2, 0, 1, *) |
| 58 | N/A | N/A | N/A | N/A | N/A | N/A | N/A |
| 59 | N/A | N/A | N/A | N/A | N/A | N/A | N/A |
| 60 | N/A | N/A | N/A | N/A | N/A | N/A | N/A |
| 61 | N/A | N/A | N/A | N/A | N/A | N/A | N/A |
| 62 | N/A | N/A | N/A | N/A | N/A | N/A | N/A |
| 63 | N/A | N/A | N/A | N/A | N/A | N/A | N/A |

NOTE:
* UpPTS

It can be seen from the foregoing table that in a TDD technology of the current LTE communications system, after the base station semi-statically designates an index number PRACH configuration index, the UE may determine random access resources corresponding to different uplink-downlink subframe configurations. To be specific, the UE needs to receive a predefined uplink-downlink subframe configuration sent by the base station, to determine, by querying the table, a time-frequency resource on which the random access procedure should be initiated. However, in a future communications system (for example, a 5th Generation (5th Generation, 5G) network communications system, where an official name of a related technology of the 5G communications system is a New Radio (New Radio, NR) technology in a current standard), to use limited radio resources more efficiently, a dynamic-time division duplex (Dynamic-Time Division Duplexing, D-TDD) technology becomes a necessary technology of improving radio resource usage flexibility. In the D-TDD technology, uplink and downlink resources of the cell are dynamically determined by a network side. In other words, there is no predefined limited uplink-downlink subframe configuration, and therefore, the existing solution that the higher layer signaling is used to semi-statically provide the index number to indicate the random access resource is no longer applicable.

Figure 2:
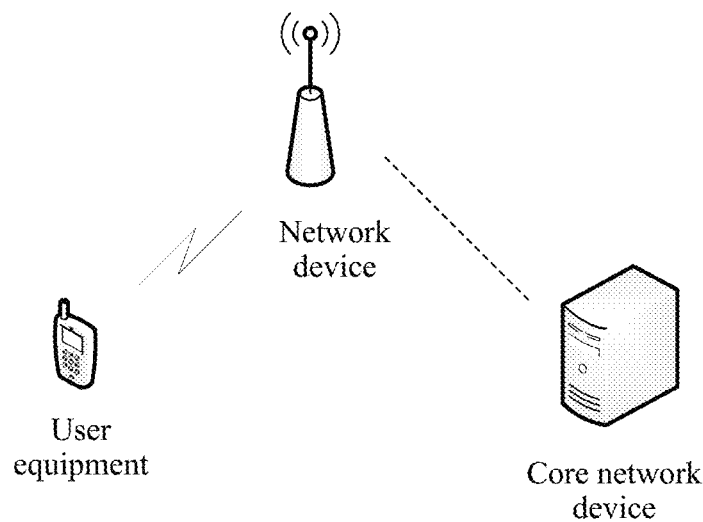
FIG. 2 is a diagram of a system architecture of an example communications system according to an embodiment of the present invention.

In the background of the prior art, the embodiments of the present invention provide a data transmission method, a network device, and user equipment, to dynamically indicate a time-frequency resource of a physical random access channel in the future communications system. Referring to FIG. 2, FIG. 2 is a diagram of a system architecture of an example communications system according to an embodiment of the present invention. The communications system includes a core network device, a network device, and user equipment. The example communications system may be an LTE communications system, or may be a future communications system using a 5G new radio NR technology. For example, in the LTE communications system, the core network device may include, for example, a mobility management entity (MME) or a serving gateway (S-GW). The MME is mainly responsible for a signaling processing part, namely, control plane functions, including functions such as access control, mobility management, attachment and detachment, a session management function, and gateway selection. The S-GW is mainly responsible for a user plane function of forwarding user data, namely, routing and forwarding a data packet under control of the MME. The network device may include, for example, an evolved mobile base station (Evolved Node B, eNode B), or may be a base station in a 5G network. The network device is mainly responsible for at least one of functions such as radio resource management, quality of service (QoS) management, and data compression and encryption on an air interface side. On a core network side, the eNodeB is mainly responsible for forwarding control plane signaling to the MME and forwarding user plane service data to the S-GW. The user equipment UE may include, for example, a handheld device, an in-vehicle device, a wearable device, and a computing device that have a wireless communication function, another processing device connected to a wireless modem, a mobile station (MS), and a terminal device. For ease of description, these devices are simply referred to as user equipment or UE in this application.

The following describes the embodiments of the present invention in detail with reference to the accompanying drawings, so that a person skilled in the art understands the embodiments of the present invention.

Figure 3:
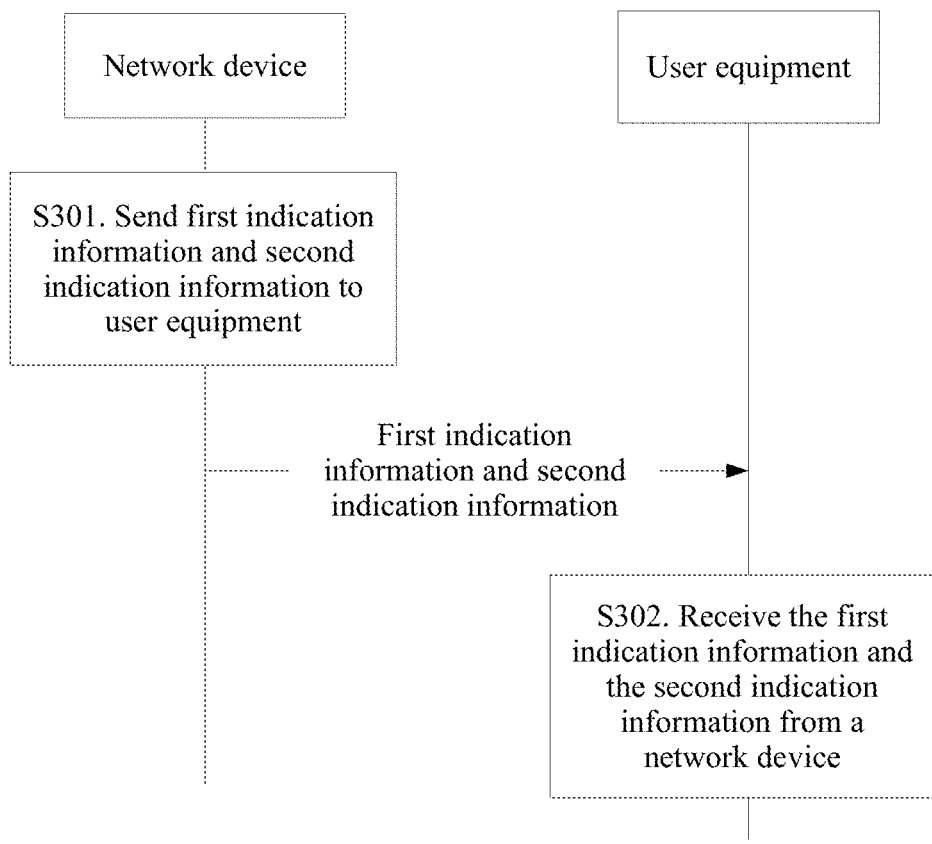
FIG. 3 is a schematic flowchart of a data transmission method according to an embodiment of the present invention.

As shown in FIG. 3, a data transmission method provided in an embodiment of the present invention includes the following steps:

S301. A network device sends first indication information and second indication information to user equipment, where the first indication information is used to indicate a frequency domain resource of a physical random access channel of the user equipment, the second indication information is physical layer control signaling, the second indication information is used to indicate a time domain resource of the physical random access channel, and a random access resource determined by the frequency domain resource and the time domain resource is used to carry random access information of the user equipment.

S302. The user equipment receives the first indication information and the second indication information from the network device, where the first indication information is used to indicate the frequency domain resource of the physical random access channel of the user equipment, the second indication information is a physical layer control signalling, the second indication information is used to indicate the time domain resource of the physical random access channel, and the random access resource determined by the frequency domain resource and the time domain resource is used to carry the random access information of the user equipment.

Further, the user equipment determines the frequency domain resource of the physical random access channel based on the first indication information, determines the time domain resource of the physical random access channel based on the second indication information, adds the random access information to the random access resource determined by the frequency domain resource and the time domain resource, and sends the random access information to the network device.

Further, the network device receives the random access information that is of the user equipment and that is carried on the random access resource.

The second indication information may be specifically common physical layer downlink control signaling, or may be a group physical layer downlink control signaling. When the second indication information is common physical layer downlink control signaling, the network device sends the second indication information to all user equipments in a cell; or when the second indication information is group physical layer downlink control signaling, the network device sends the second indication information to some user equipments in a cell.

The first indication information includes system information or radio resource control signaling.

It can be learned that in this embodiment of the present invention, the first indication information indicates the frequency domain resource of the physical random access channel of the user equipment, the second indication information indicates the time domain resource of the physical random access channel, and the second indication information is physical layer control signaling. In comparison with a method for semi-statically indicating a random access resource by periodically sending a SIB broadcast message in the prior art, the physical layer control signaling is notified in real time, and therefore, the time domain resource of the physical random access channel can be dynamically indicated by using the physical layer control signaling. Therefore, this embodiment of the present invention can meet a requirement for dynamic indication of a random access resource in a communications system, and improve random access resource allocation flexibility.

In a specific implementation, the second indication information is carried on a time domain resource unit n; and the time domain resource is a time domain resource unit n+k that is separated from the time domain resource unit n by k time domain resource units, the time domain resource unit is a preset transmission time interval in time domain, or the time domain resource unit is a preset transmission time period in time domain, n is an integer greater than or equal to 0, and k is an integer greater than or equal to 0.

The transmission time interval is a length of independent decoding transmission on a radio link, and is a time domain resource unit concept of a logical layer, for example, a transmission time interval (Transmission Time Interval, TTI) parameter in an LTE system. The transmission time period is a time domain resource allocation duration parameter of a physical layer, and is a time domain resource unit concept of the physical layer, for example, a subframe parameter in the LTE system.

Optionally, in this embodiment of the present invention, the second indication information is scrambled based on a preset identifier, and the preset identifier is used by the user equipment to: descramble the second indication information, and determine that the time domain resource unit n+k is used as the time domain resource of the physical random access channel.

The preset identifier is used to identify that the time domain resource unit n+k is used as the time domain resource of the physical random access channel. The preset identifier may be a preset specific radio network temporary identifier (Radio Network Temporary Identifier, RNTI) that is used to scramble and descramble the second indication information, for example, may be a radio network temporary identifier of the physical random access channel.

For example, referring to FIG. 3.1, FIG. 3.1 is a schematic diagram of a time-frequency resource of a physical random access channel according to an embodiment of the present invention. It is assumed that the first indication information is a system information block (System Information Block, SIB) broadcast message, and the SIB broadcast message indicates a frequency domain resource that may be used by a physical random access channel (Physical Random Access Channel, PRACH) of UE in the cell. As shown by a dashed line box in FIG. 3.1, the second indication information is a downlink control information (Downlink Control Information, DCI). DCI on first, second, and third time domain resource units is DCI that is not scrambled by using the radio network temporary identifier of the physical random access channel, and DCI on fourth and fifth time domain resource units is DCI that is scrambled by using the radio network temporary identifier of the physical random access channel. A random access procedure between the network device and the user equipment may include:

The network device sends the SIB broadcast message and the DCI to the user equipment;

the user equipment receives the SIB broadcast message and the DCI from the network device; determines, based on the SIB broadcast message, a frequency domain resource F1 that may be used by the PRACH of the UE in the cell; descrambles the DCI by using the radio network temporary identifier of the physical random access channel; after DCI on the fourth time domain resource unit and DCI on the fifth time domain resource unit are successfully descrambled, determines that a frequency domain resource F1 on the fourth time domain resource unit and a frequency domain resource F1 on the fifth time domain resource unit, namely, resources that are jointly marked by the dashed line box and a solid line box in the figure are random access resources that may be used by the PRACH; adds the random access information to the random access resources; and sends the random access information to the network device; and the network device receives the random access information that is sent by the user equipment and that is carried on the random access resources.

Optionally, in this embodiment of the present invention, the second indication information includes a first indicator field, and the first indicator field is used to indicate that the time domain resource unit n+k is used as the time domain resource of the physical random access channel.

The first indicator field may be, for example, a bit that carries identification information 0 or 1 in the second indication information. The network device may set the identification information 0 or 1, to notify the user equipment that the time domain resource unit n+k is used as the time domain resource of the physical random access channel.

For example, referring to FIG. 3.2, FIG. 3.2 is a schematic diagram of a time-frequency resource of another physical random access channel according to an embodiment of the present invention. It is assumed that the first indication information is a system information block SIB broadcast message, and the SIB broadcast message notifies the UE of a frequency domain resource that may be used by a physical random access channel PRACH in the cell. As shown by a dashed line box in FIG. 3.2, the second indication information is a downlink control information DCI. The DCI includes a first indicator field, and the first indicator field is a bit that carries identification information 0 or 1, where 1 indicates that a time domain resource unit corresponding to current DCI is used as the time domain resource of the physical random access channel of the user equipment. As shown by a solid line box in FIG. 3.2, identification information of first indicator fields in DCI on first, second, and third time domain resource units is 0, and corresponding time domain resource units are not used as the time domain resource of the PRACH; identification information of first indicator fields in DCI on fourth and fifth time domain resource units is 1, and corresponding time domain resource units are used as the time domain resource of the PRACH. A random access procedure between the network device and the user equipment may specifically include:

The network device sends the SIB broadcast message and the DCI to the user equipment;

the user equipment receives the SIB broadcast message and the DCI from the network device; determines, based on the SIB broadcast message, a frequency domain resource F2 that may be used by the PRACH of the UE in the cell; detects that first indicator fields in DCI on the fourth time domain resource unit and the fifth time domain resource unit are 1; determines that a frequency domain resource F2 on the fourth time domain resource unit and a frequency domain resource F2 on the fifth time domain resource unit, namely, resources that are jointly marked by the dashed line box and the solid line box in the figure are random access resources that may be used by the PRACH; adds the random access information to the random access resources; and sends the random access information to the network device; and the network device receives the random access information that is sent by the user equipment and that is carried on the random access resources.

Further, optionally, in this embodiment of the present invention, the first indicator field is further used to indicate a value of k.

The first indicator field may be, for example, three bits that carry the identification information 0 or 1 in the second indication information, and the three bits are used to indicate a specific value of k. For example, 000 corresponds to k=0, 001 corresponds to k=1, 010 corresponds to k=2, 011 corresponds to k=3, 100 corresponds to k=4, 101 corresponds to k=5, 110 corresponds to k=6, and 111 corresponds to k=7.

Figure 4:
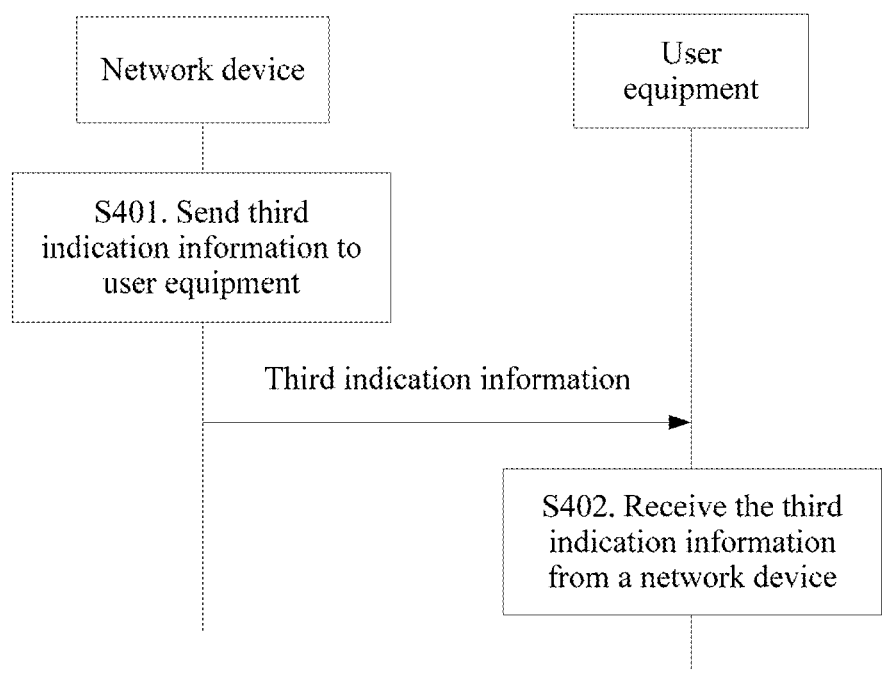
FIG. 4 is a schematic flowchart of another data transmission method according to an embodiment of the present invention.

As shown in FIG. 4, another data transmission method provided in an embodiment of the present invention includes the following steps:

S401. A network device sends third indication information to user equipment, where the third indication information is physical layer control signaling, the third indication information is used to indicate a frequency domain resource and a time domain resource that are of a physical random access channel of the user equipment, and a random access resource determined by the frequency domain resource and the time domain resource is used to carry random access information of the user equipment.

S402. The user equipment receives the third indication information from the network device, where the third indication information is physical layer control signaling, the third indication information is used to indicate the frequency domain resource and the time domain resource that are of the physical random access channel of the user equipment, and the random access resource determined by the frequency domain resource and the time domain resource is used to carry the random access information of the user equipment.

Further, the user equipment determines the time domain resource and the frequency domain resource of the physical random access channel based on the third indication information, adds the random access information to the random access resource determined by the frequency domain resource and the time domain resource, and sends the random access information to the network device.

Further, the network device receives the random access information that is of the user equipment and that is carried on the random access resource.

The third indication information may be specifically common physical layer downlink control signaling, or may be a group physical layer downlink control signaling. When the third indication information is common physical layer downlink control signaling, the network device sends the third indication information to all user equipments in a cell; or when the third indication information is group physical layer downlink control signaling, the network device sends the third indication information to some user equipments in a cell.

It can be learned that in this embodiment of the present invention, the third indication information indicates the frequency domain resource and the time domain resource of the physical random access channel of the user equipment, and the third indication information is physical layer control signaling. In comparison with a method for semi-statically indicating a random access resource by periodically sending a SIB broadcast message in the prior art, the physical layer control signaling is notified in real time, and therefore, a time-frequency resource of the physical random access channel can be dynamically indicated by using the physical layer control signaling. Therefore, this embodiment of the present invention can meet a requirement for dynamic indication of a random access resource in a communications system, and improve random access resource allocation flexibility.

Optionally, in this embodiment of the present invention, the third indication information includes a second indicator field, and the second indicator field is used to indicate the frequency domain resource.

The second indicator field may be, for example, a plurality of bits that carry identification information 0 or 1 in the third indication information. The bits are used to indicate a specific frequency domain resource that is on a time domain resource unit and that may be used as the frequency domain resource of the physical random access channel of the user equipment. For example, an identification information sequence 001 corresponding to the bits is used to indicate that a frequency domain resource whose index is 1 is used as the frequency domain resource of the physical random access channel.

For example, referring to FIG. 4.1, FIG. 4.1 is a schematic diagram of a time-frequency resource of still another physical random access channel according to an embodiment of the present invention. It is assumed that the third indication information is a downlink control information DCI, and the DCI includes a second indicator field. As shown in the figure, when the UE detects, in a downlink (Down Link, DL) control field, that fourth and fifth time domain resource units include the DCI, the UE determines that fourth and fifth time domain resource units may be used as time domain resources of the PRACH of the UE. Then, a location of the frequency domain resource is determined based on the second indicator field in the DCI. For example, 001 corresponds to a frequency domain location of the PRACH in the figure.

Optionally, in this embodiment of the present invention, the third indication information is carried on a time domain resource unit n; and the time domain resource is a time domain resource unit n+k that is separated from the time domain resource unit n by k time domain resource units, the time domain resource unit is a preset transmission time interval in time domain, or the time domain resource unit is a preset transmission time period in time domain, n is an integer greater than or equal to 0, and k is an integer greater than or equal to 0.

The transmission time interval is a length of independent decoding transmission on a radio link, and is a time domain resource unit concept of a logical layer, for example, a transmission time interval TTI parameter in an LTE system. The transmission time period is a time domain resource allocation duration parameter of a physical layer, and is a time domain resource unit concept of the physical layer, for example, a subframe parameter in the LTE system.

Optionally, in this embodiment of the present invention, a format of the third indication information is a preset format, and the preset format is used to indicate that the time domain resource unit n+k is used as the time domain resource of the physical random access channel.

Optionally, in this embodiment of the present invention, the third indication information is scrambled based on a preset identifier, and the preset identifier is used by the user equipment to: descramble the third indication information, and determine that the time domain resource unit n+k is used as the time domain resource of the physical random access channel.

The preset identifier may be a preset specific radio network temporary identifier RNTI that is used to scramble and descramble the third indication information, for example, may be a radio network temporary identifier of the physical random access channel.

Optionally, in this embodiment of the present invention, the third indication information includes a third indicator field, and the third indicator field is used to indicate that the time domain resource unit n+k is used as the time domain resource of the physical random access channel.

The third indicator field may be, for example, a bit that carries identification information 0 or 1 in the third indication information. The network device may set the identification information 0 or 1, to notify the user equipment that the time domain resource unit n+k is used as the time domain resource of the physical random access channel.

Further, optionally, in this embodiment of the present invention, the third indicator field is further used to indicate a value of k.

The third indicator field may be, for example, three bits that carry the identification information 0 or 1 in the third indication information, and the three bits are used to indicate a specific value of k. For example, 000 corresponds to k=0, 001 corresponds to k=1, 010 corresponds to k=2, 011 corresponds to k=3, 100 corresponds to k=4, 101 corresponds to k=5, 110 corresponds to k=6, and 111 corresponds to k=7.

The following describes an apparatus for implementing the foregoing methods in the embodiments of the present invention with reference to the accompanying drawings.

Figure 5:
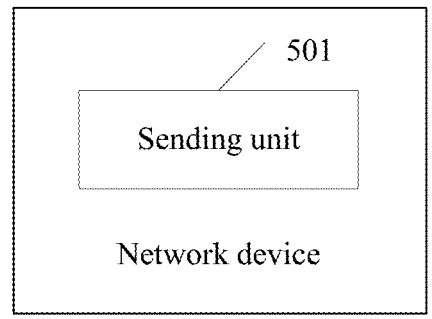
FIG. 5 is a block diagram of a functional unit of a network device according to an embodiment of the present invention.

Referring to FIG. 5, FIG. 5 is a block diagram of a functional unit of a network device according to an embodiment of the present invention.

As shown in FIG. 5, the network device 500 may include a sending unit 501.

The sending unit 501 is configured to send first indication information and second indication information to user equipment, where the first indication information is used to indicate a frequency domain resource of a physical random access channel of the user equipment, the second indication information is physical layer control signaling, the second indication information is used to indicate a time domain resource of the physical random access channel, and a random access resource determined by the frequency domain resource and the time domain resource is used to carry random access information of the user equipment.

The first indication information includes system information or radio resource control signaling.

Optionally, the second indication information is carried on a time domain resource unit n; and the time domain resource is a time domain resource unit n+k that is separated from the time domain resource unit n by k time domain resource units, the time domain resource unit is a preset transmission time interval in time domain, or the time domain resource unit is a preset transmission time period in time domain, n is an integer greater than or equal to 0, and k is an integer greater than or equal to 0.

Optionally, the second indication information is scrambled based on a preset identifier, and the preset identifier is used by the user equipment to: descramble the second indication information, and determine that the time domain resource unit n+k is used as the time domain resource of the physical random access channel.

Optionally, the second indication information includes a first indicator field, and the first indicator field is used to indicate that the time domain resource unit n+k is used as the time domain resource of the physical random access channel.

Optionally, the first indicator field is further used to indicate a value of k.

Alternatively, the sending unit 501 of the network device 500 is configured to send third indication information to user equipment, where the third indication information is physical layer control signaling, the third indication information is used to indicate a frequency domain resource and a time domain resource that are of a physical random access channel of the user equipment, and a random access resource determined by the frequency domain resource and the time domain resource is used to carry random access information of the user equipment.

The third indication information includes a second indicator field, and the second indicator field is used to indicate the frequency domain resource.

Optionally, the third indication information is carried on a time domain resource unit n; and the time domain resource is a time domain resource unit n+k that is separated from the time domain resource unit n by k time domain resource units, the time domain resource unit is a preset transmission time interval in time domain, or the time domain resource unit is a preset transmission time period in time domain, n is an integer greater than or equal to 0, and k is an integer greater than or equal to 0.

Optionally, a format of the third indication information is a preset format, and the preset format is used to indicate that the time domain resource unit n+k is used as the time domain resource of the physical random access channel.

Optionally, the third indication information is scrambled based on a preset identifier, and the preset identifier is used by the user equipment to: descramble the third indication information, and determine that the time domain resource unit n+k is used as the time domain resource of the physical random access channel.

Optionally, the third indication information includes a third indicator field, and the third indicator field is used to indicate that the time domain resource unit n+k is used as the time domain resource of the physical random access channel.

Further, optionally, the third indicator field is further used to indicate a value of k.

It should be noted that the foregoing unit (the sending unit 501) may be configured to perform related steps in the foregoing method embodiments.

In this embodiment, the network device 500 is presented in a unit form. The "unit" herein may be an application-specific integrated circuit (application-specific integrated circuit, ASIC), a processor or a memory that executes one or more software or firmware programs, an integrated logic circuit, and/or another component that may provide the foregoing functions. A person skilled in the art may know that a composition form of the network device 500 may be specifically a network device shown in FIG. 7.

Figure 7:
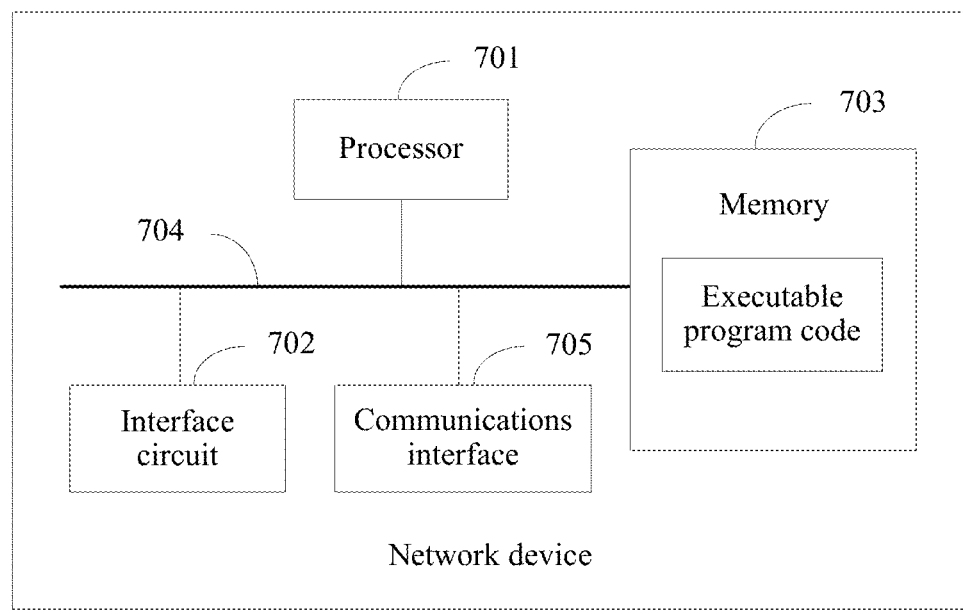
FIG. 7 is a schematic structural diagram of a network device according to an embodiment of the present invention.

For example, a function of the sending unit 501 may be implemented by the network device shown in FIG. 7. Specifically, a processor 701 may invoke executable program code in a memory 703, to send the first indication information and the second indication information to the user equipment by using an interface circuit 702, or send the third indication information to the user equipment by using an interface circuit 702.

It can be learned that this embodiment of the present invention can meet a requirement for dynamic indication of a random access resource in a communications system, and improve random access resource allocation flexibility.

Figure 6:
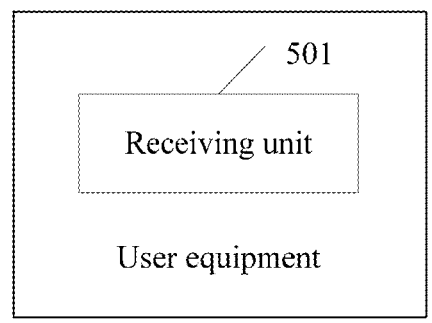
FIG. 6 is a block diagram of a functional unit of user equipment according to an embodiment of the present invention.

Referring to FIG. 6, FIG. 6 is a block diagram of a functional unit of user equipment according to an embodiment of the present invention.

As shown in FIG. 6, the user equipment 600 may include a receiving unit 601.

The receiving unit is configured to receive first indication information and second indication information from a network device, where the first indication information is used to indicate a frequency domain resource of a physical random access channel of the user equipment, the second indication information is a physical layer control signalling, the second indication information is used to indicate a time domain resource of the physical random access channel, and a random access resource determined by the frequency domain resource and the time domain resource is used to carry random access information of the user equipment.

The first indication information includes system information or radio resource control signaling.

Optionally, the second indication information is carried on a time domain resource unit n; and the time domain resource is a time domain resource unit n+k that is separated from the time domain resource unit n by k time domain resource units, the time domain resource unit is a preset transmission time interval in time domain, or the time domain resource unit is a preset transmission time period in time domain, n is an integer greater than or equal to 0, and k is an integer greater than or equal to 0.

Optionally, the second indication information is scrambled based on a preset identifier, and the preset identifier is used by the user equipment to: descramble the second indication information, and determine that the time domain resource unit n+k is used as the time domain resource of the physical random access channel.

Optionally, the second indication information includes a first indicator field, and the first indicator field is used to indicate that the time domain resource unit n+k is used as the time domain resource of the physical random access channel.

Optionally, the first indicator field is further used to indicate a value of k.

Alternatively, the receiving unit 601 of the user equipment 600 is configured to receive third indication information from a network device, where the third indication information is physical layer control signaling, the third indication information is used to indicate a frequency domain resource and a time domain resource that are of a physical random access channel of the user equipment, and a random access resource determined by the frequency domain resource and the time domain resource is used to carry random access information of the user equipment.

Optionally, the third indication information includes a second indicator field, and the second indicator field is used to indicate the frequency domain resource.

Optionally, the third indication information is carried on a time domain resource unit n; and the time domain resource is a time domain resource unit n+k that is separated from the time domain resource unit n by k time domain resource units, the time domain resource unit is a preset transmission time interval in time domain, or the time domain resource unit is a preset transmission time period in time domain, n is an integer greater than or equal to 0, and k is an integer greater than or equal to 0.

Optionally, a format of the third indication information is a preset format, and the preset format is used to indicate that the time domain resource unit n+k is used as the time domain resource of the physical random access channel.

The time domain resource is determined by the user equipment when the user equipment detects that the format of the third indication information is the preset format.

Optionally, the third indication information is scrambled based on a preset identifier, and the preset identifier is used by the user equipment to: descramble the third indication information, and determine that the time domain resource unit n+k is used as the time domain resource of the physical random access channel.

Optionally, the third indication information includes a third indicator field, and the third indicator field is used to indicate that the time domain resource unit n+k is used as the time domain resource of the physical random access channel.

Further, optionally, the third indicator field is further used to indicate a value of k.

It should be noted that the foregoing unit (the receiving unit 601) is configured to perform related steps of the foregoing methods.

In this embodiment, the user equipment 600 is presented in a unit form. The "unit" herein may be an application-specific integrated circuit (application-specific integrated circuit, ASIC), a processor or a memory that executes one or more software or firmware programs, an integrated logic circuit, and/or another component that may provide the foregoing functions. A person skilled in the art may know that a composition form of the user equipment 600 may be specifically user equipment shown in FIG. 8.

Figure 8:
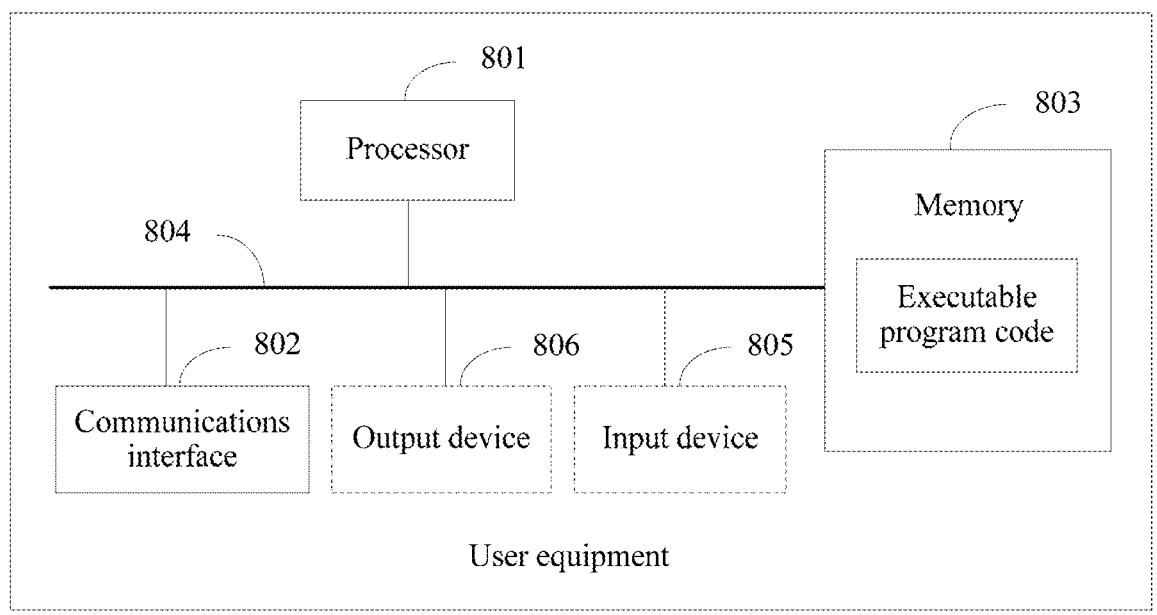
FIG. 8 is a schematic structural diagram of user equipment according to an embodiment of the present invention.

For example, a function of the receiving unit 601 may be implemented by the user equipment shown in FIG. 8. Specifically, a processor 801 may invoke executable program code in a memory 803, to send the first indication information and the second indication information to the network device by using a communications interface 802, or send the third indication information to the network device by using a communications interface 802.

It can be learned that this embodiment of the present invention can meet a requirement for dynamic indication of a random access resource in a communications system, and improve random access resource allocation flexibility.

Referring to FIG. 7, FIG. 7 is a schematic structural diagram of a network device according to an embodiment of the present invention.

As shown in the figure, the network device provided in this embodiment of the present invention includes a processor 701, an interface circuit 702, a memory 703, and a bus 704. The processor 701, the interface circuit 702, and the memory 703 are connected and complete mutual communication by using the bus 704.

Optionally, the network device further includes a communications interface 705, which is configured to communicate with another device on a network side. The another device on the network side includes but is not limited to another network device or a core network device.

The interface circuit 702 is configured to communicate with user equipment under control of the processor 701, and the memory 703 stores executable program code.

The processor 701 is configured to invoke the executable program code, to perform the following operation:

sending, by using the interface circuit 702, first indication information and second indication information to the user equipment, where the first indication information is used to indicate a frequency domain resource of a physical random access channel of the user equipment, the second indication information is physical layer control signaling, the second indication information is used to indicate a time domain resource of the physical random access channel, and a random access resource determined by the frequency domain resource and the time domain resource is used to carry random access information of the user equipment.

The first indication information includes system information or radio resource control signaling.

Optionally, the second indication information is carried on a time domain resource unit n; and the time domain resource is a time domain resource unit n+k that is separated from the time domain resource unit n by k time domain resource units, the time domain resource unit is a preset transmission time interval in time domain, or the time domain resource unit is a preset transmission time period in time domain, n is an integer greater than or equal to 0, and k is an integer greater than or equal to 0.

Optionally, the second indication information is scrambled based on a preset identifier, and the preset identifier is used by the user equipment to: descramble the second indication information, and determine that the time domain resource unit n+k is used as the time domain resource of the physical random access channel.

Optionally, the second indication information includes a first indicator field, and the first indicator field is used to indicate that the time domain resource unit n+k is used as the time domain resource of the physical random access channel.

Optionally, the first indicator field is further used to indicate a value of k.

Alternatively, the processor 701 is configured to invoke the executable program code, to perform the following operation:

sending, by using the interface circuit 702, third indication information to the user equipment, where the third indication information is physical layer control signaling, the third indication information is used to indicate a frequency domain resource and a time domain resource that are of a physical random access channel of the user equipment, and a random access resource determined by the frequency domain resource and the time domain resource is used to carry random access information of the user equipment.

Optionally, the third indication information includes a second indicator field, and the second indicator field is used to indicate the frequency domain resource.

Optionally, the third indication information is carried on a time domain resource unit n; and the time domain resource is a time domain resource unit n+k that is separated from the time domain resource unit n by k time domain resource units, the time domain resource unit is a preset transmission time interval in time domain, or the time domain resource unit is a preset transmission time period in time domain, n is an integer greater than or equal to 0, and k is an integer greater than or equal to 0.

Optionally, a format of the third indication information is a preset format, and the preset format is used to indicate that the time domain resource unit n+k is used as the time domain resource of the physical random access channel.

Optionally, the third indication information is scrambled based on a preset identifier, and the preset identifier is used by the user equipment to: descramble the third indication information, and determine that the time domain resource unit n+k is used as the time domain resource of the physical random access channel.

Optionally, the third indication information includes a third indicator field, and the third indicator field is used to indicate that the time domain resource unit n+k is used as the time domain resource of the physical random access channel.

Optionally, the third indicator field is further used to indicate a value of k.

It should be noted that the processor 701 herein may be one processor, or may be a general term of a plurality of processing elements. For example, the processor may be a central processing unit (Central Processing Unit, CPU), or may be an application-specific integrated circuit (Application Specific Integrated Circuit, ASIC), or one or more integrated circuits configured to implement this embodiment of the present invention, for example, one or more microprocessors (digital signal processor, DSP) or one or more field programmable gate arrays (Field Programmable Gate Array, FPGA).

The memory 703 may be a storage apparatus or may be a general term of a plurality of storage elements, and is configured to store the executable program code or a parameter, data, and the like that are required for running an access network management device. In addition, the memory 703 may include a random access memory (RAM), or may include a nonvolatile memory (non-volatile memory), such as a magnetic disk memory or a flash memory (Flash).

The bus 704 may be an industry standard architecture (Industry Standard Architecture, ISA) bus, a peripheral component interconnect (Peripheral Component, PCI) bus, an extended industry standard architecture (Extended Industry Standard Architecture, EISA) bus, or the like. The bus 704 may be classified into an address bus, a data bus, a control bus, and the like. For ease of representation, only one thick line is used to represent the bus in FIG. 7, but this does not mean that there is only one bus or only one type of bus.

In the embodiment shown in FIG. 5, a function of each unit may be implemented based on a structure of the network device.

Referring to FIG. 8, FIG. 8 is a schematic structural diagram of user equipment according to an embodiment of the present invention.

As shown in the figure, the user equipment provided in this embodiment of the present invention includes a processor 801, a communications interface 802, a memory 803, and a bus 804. The processor 801, the communications interface 802, and the memory 803 are connected and complete mutual communication by using the bus 804.

The communications interface 802 is configured to communicate with a network device under control of the processor 801, and the memory 803 stores executable program code.

The processor 801 is configured to invoke the executable program code, to perform the following operation:

receiving, by using the communications interface 802, first indication information and second indication information from the network device, where the first indication information is used to indicate a frequency domain resource of a physical random access channel of the user equipment, the second indication information is a physical layer control signalling, the second indication information is used to indicate a time domain resource of the physical random access channel, and a random access resource determined by the frequency domain resource and the time domain resource is used to carry random access information of the user equipment.

The first indication information includes system information or radio resource control signaling.

Optionally, the second indication information is carried on a time domain resource unit n; and the time domain resource is a time domain resource unit n+k that is separated from the time domain resource unit n by k time domain resource units, the time domain resource unit is a preset transmission time interval in time domain, or the time domain resource unit is a preset transmission time period in time domain, n is an integer greater than or equal to 0, and k is an integer greater than or equal to 0.

Optionally, the second indication information is scrambled based on a preset identifier, and the preset identifier is used by the user equipment to: descramble the second indication information, and determine that the time domain resource unit n+k is used as the time domain resource of the physical random access channel.

Optionally, the second indication information includes a first indicator field, and the first indicator field is used to indicate that the time domain resource unit n+k is used as the time domain resource of the physical random access channel.

Optionally, the first indicator field is further used to indicate a value of k.

Alternatively, the processor 801 is configured to invoke the executable program code, to perform the following operation:

receiving, by using the communications interface 802, third indication information from the network device, where the third indication information is physical layer control signaling, the third indication information is used to indicate a frequency domain resource and a time domain resource that are of a physical random access channel of the user equipment, and a random access resource determined by the frequency domain resource and the time domain resource is used to carry random access information of the user equipment.

Optionally, the third indication information includes a second indicator field, and the second indicator field is used to indicate the frequency domain resource.

Optionally, the third indication information is carried on a time domain resource unit n; and the time domain resource is a time domain resource unit n+k that is separated from the time domain resource unit n by k time domain resource units, the time domain resource unit is a preset transmission time interval in time domain, or the time domain resource unit is a preset transmission time period in time domain, n is an integer greater than or equal to 0, and k is an integer greater than or equal to 0.

Optionally, a format of the third indication information is a preset format, and the preset format is used to indicate that the time domain resource unit n+k is used as the time domain resource of the physical random access channel.

The time domain resource is determined by the user equipment when the user equipment detects that the format of the third indication information is the preset format.

Optionally, the third indication information is scrambled based on a preset identifier, and the preset identifier is used by the user equipment to: descramble the third indication information, and determine that the time domain resource unit n+k is used as the time domain resource of the physical random access channel.

Optionally, the third indication information includes a third indicator field, and the third indicator field is used to indicate that the time domain resource unit n+k is used as the time domain resource of the physical random access channel.

Optionally, the third indicator field is further used to indicate a value of k.

It should be noted that the processor 801 herein may be one processor, or may be a general term of a plurality of processing elements. For example, the processor may be a central processing unit (Central Processing Unit, CPU), or may be an application-specific integrated circuit (Application Specific Integrated Circuit, ASIC), or one or more integrated circuits configured to implement this embodiment of the present invention, for example, one or more microprocessors (digital signal processor, DSP) or one or more field programmable gate arrays (Field Programmable Gate Array, FPGA).

The communications interface 802 may include one or more of an antenna, at least one amplifier, a transceiver, a coupler, an LNA (low noise amplifier), a duplexer, and the like. The communications interface 802 may also communicate with the network device through wireless communication. The wireless communication may use any communications standard or protocol that includes but is not limited to GSM (Global System for Mobile Communications), GPRS (general packet radio service), CDMA (Code Division Multiple Access), WCDMA (Wideband Code Division Multiple Access), LTE (Long Term Evolution, Long Term Evolution), an email, an SMS (short message service), and the like.

The memory 803 may be a storage apparatus or may be a general term of a plurality of storage elements, and is configured to store the executable program code or a parameter, data, and the like that are required for running an access network management device. In addition, the memory 803 may include a random access memory (RAM), or may include a nonvolatile memory (non-volatile memory), such as a magnetic disk memory or a flash memory (Flash).

The bus 804 may be an industry standard architecture (Industry Standard Architecture, ISA) bus, a peripheral component interconnect (Peripheral Component, PCI) bus, an extended industry standard architecture (Extended Industry Standard Architecture, EISA) bus, or the like. The bus 804 may be classified into an address bus, a data bus, a control bus, and the like. For ease of representation, only one thick line is used to represent the bus in FIG. 8, but this does not mean that there is only one bus or only one type of bus.

The user equipment may further include an input device 805 and an output device 806 that are connected to the bus 804, so that the input device 805 and the output device 806 are connected to other parts such as the processor 801 by using the bus 804.

In the embodiment shown in FIG. 6, a function of each unit may be implemented based on a structure of the user equipment.

In the embodiments shown in FIG. 3 and FIG. 4, each step or method procedure may be implemented based on the structure of the network device shown in FIG. 7 and the structure of the user equipment shown in FIG. 8.

An embodiment of the present invention further provides a computer readable storage medium, configured to store a computer software instruction used by the foregoing network device. The computer software instruction includes a program designed for executing the foregoing method embodiments. Data transmission may be implemented by executing the stored program.

An embodiment of the present invention further provides a computer readable storage medium, configured to store a computer software instruction used by the foregoing user equipment. The computer software instruction includes a program designed for executing the foregoing method embodiments. Data transmission may be implemented by executing the stored program.

Although the present invention is described with reference to the embodiments, in a process of implementing the present invention that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

A person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a magnetic disk memory, a CD-ROM, an optical memory, and the like) that include computer-usable program code. The computer program is stored/distributed in a proper medium and is provided as or used as a part of the hardware together with another hardware, or may be distributed in another form, for example, by using the Internet or another wired or wireless telecommunications system.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

The embodiments of the present invention are described in detail above. The principles and implementations of the present invention are described in this specification by using specific examples. The description of the foregoing embodiments is merely intended to help understand the method and core ideas of the present invention. In addition, a person of ordinary skill in the art can make modifications to a specific implementation and an application scope based on the ideas of the present invention. In conclusion, the content of this specification shall not be construed as a limitation on the present invention.

What is claimed is:

1. A data transmission method, comprising:
   determining indication information;
   sending the indication information to user equipment, wherein the indication information is physical layer control signaling, the indication information indicates a frequency domain resource and a time domain resource that are of a physical random access channel of the user equipment, a random access resource determined by the frequency domain resource and the time domain resource carries random access information of the user equipment, the indication information indicates whether a time domain resource unit n+k is used as the time domain resource of the physical random access channel based on whether the indication information is scrambled by using a preset identifier, wherein the indication information indicates that the time domain resource unit n+k is used as the time domain resource of the physical random access channel if the indication information is scrambled by using the preset identifier, and the indication information indicates that the time domain resource unit n+k is not used as the time domain resource of the physical random access channel if the indication information is not scrambled by using the preset identifier; and
   wherein the indication information is carried on a time domain resource unit n; and
   the time domain resource is the time domain resource unit n+k that is separated from the time domain resource unit n by k time domain resource units, n is an integer greater than or equal to 0, and k is an integer greater than or equal to 0.

2. The method according to claim 1, wherein the time domain resource unit is a preset transmission time interval in time domain, or the time domain resource unit is a preset transmission time period in time domain.

3. The method according to claim 1, wherein the indication information comprises a second indicator field, and the second indicator field indicates the frequency domain resource.

4. A communications apparatus, comprising:
   at least one processor, an interface circuit, a memory, and a bus, wherein the at least one processor, the interface circuit, and the memory are connected and communicate with one another by using the bus;
   the interface circuit is configured to communicate with another device under control of the at least one processor, and the memory stores executable program code for execution by the at least one processor, wherein the executable program code, when executed, cause the apparatus to Perform operations comprising:
   receiving indication information from a network device, wherein the indication information is physical layer control signaling, the indication information indicates a frequency domain resource and a time domain resource that are of a physical random access channel of the communications apparatus, a random access resource determined by the frequency domain resource and the time domain resource carries random access information of the communications apparatus, the indication information indicates whether a time domain resource unit n+k is used as the time domain resource of the physical random access channel based on whether the indication information is scrambled by using a preset identifier, wherein the indication information indicates that the time domain resource unit n+k is used as the time domain resource of the physical random access channel if the indication information is scrambled by using the preset identifier, and the indication information indicates that the time domain resource unit n+k is not used as the time domain resource of the physical random access channel if the indication information is not scrambled by using the preset identifier;
   sending the random access information to the network device;
   wherein the indication information is carried on a time domain resource unit n; and
   the time domain resource is the time domain resource unit n+k that is separated from the time domain resource unit n by k time domain resource units, n is an integer greater than or equal to 0, and k is an integer greater than or equal to 0.

5. The communications apparatus according to claim 4, wherein the time domain resource unit is a preset transmission time interval in time domain, or the time domain resource unit is a preset transmission time period in time domain.

6. The communications apparatus according to claim 4, wherein the indication information comprises a second indicator field, and the second indicator field indicates the frequency domain resource.

7. A network device, comprising:
   at least one processor, an interface circuit, a memory, and a bus, wherein the at least one processor, the interface circuit, and the memory are connected and communicate with one another by using the bus;
   the interface circuit is configured to communicate with user equipment under control of the at least one processor, and the memory stores executable program code for execution by the at least one processor, wherein the executable program code, when executed, cause the network device to perform operations comprising:
determining indication information;
sending the indication information to the user equipment, wherein the indication information is a physical layer control signaling, the indication information indicates a frequency domain resource and a time domain resource that are of a physical random access channel of the user equipment, a random access resource determined by the frequency domain resource and the time domain resource carries random access information of the user equipment, the indication information indicates whether a time domain resource unit n+k is used as the time domain resource of the physical random access channel based on whether the indication information is scrambled by using a preset identifier, wherein the indication information indicates that the time domain resource unit n+k is used as the time domain resource of the physical random access channel if the indication information is scrambled by using the preset identifier, and the indication information indicates that the time domain resource unit n+k is not used as the time domain resource of the physical random access channel if the indication information is not scrambled by using the preset identifier; and
wherein the indication information is carried on a time domain resource unit n; and
the time domain resource is the time domain resource unit n+k that is separated from the time domain resource unit n by k time domain resource units, n is an integer greater than or equal to 0, and k is an integer greater than or equal to 0.

8. The network device according to claim 7, wherein the time domain resource unit is a preset transmission time interval in time domain, or the time domain resource unit is a preset transmission time period in time domain.

9. The network device according to claim 7, wherein the indication information comprises a second indicator field, and the second indicator field indicates the frequency domain resource.

* * * * *